G. C. ABBE.
LOCOMOTIVE FRAME.
APPLICATION FILED APR. 18, 1910.
970,287.
Patented Sept. 13, 1910.
3 SHEETS—SHEET 3.
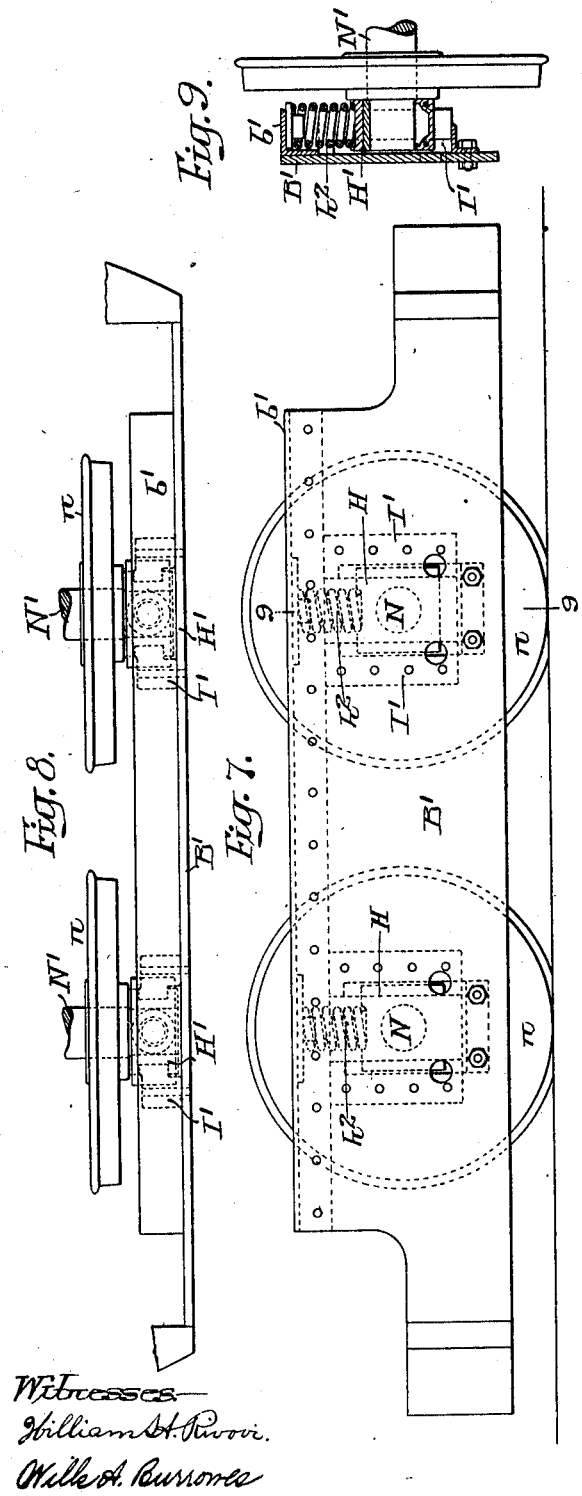
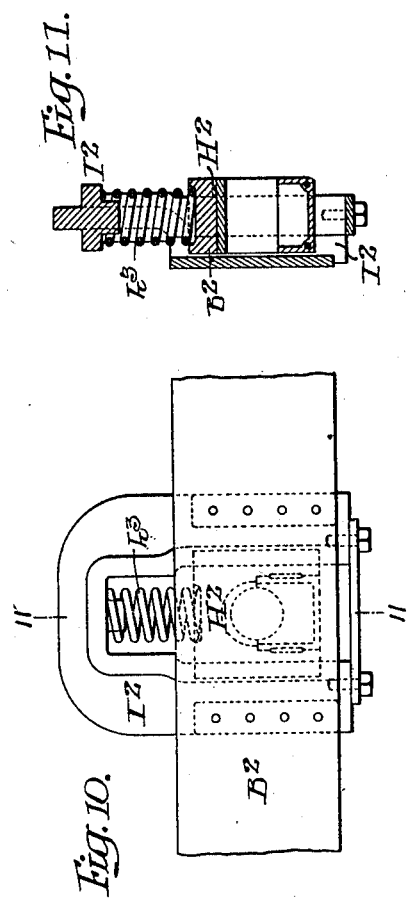

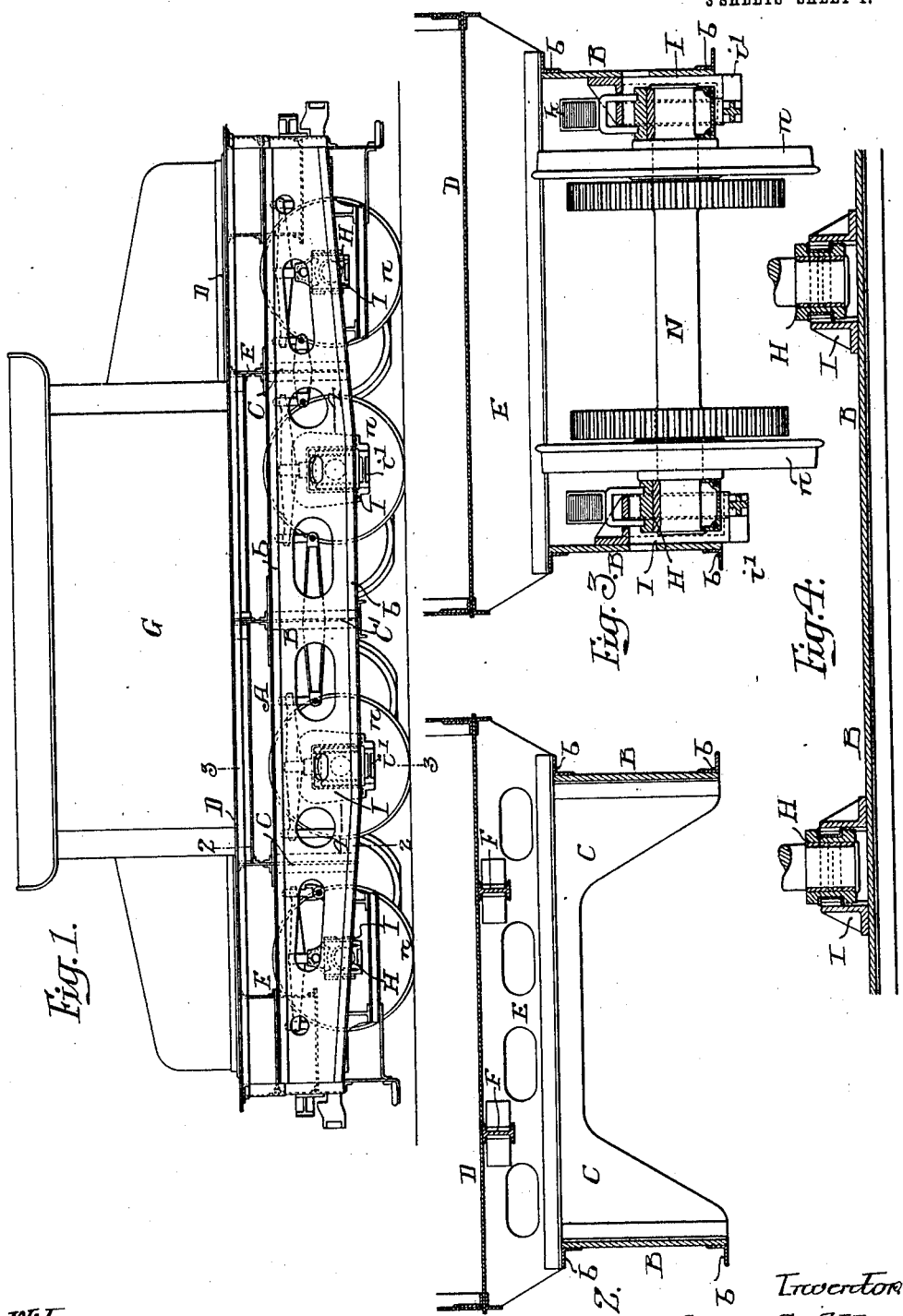

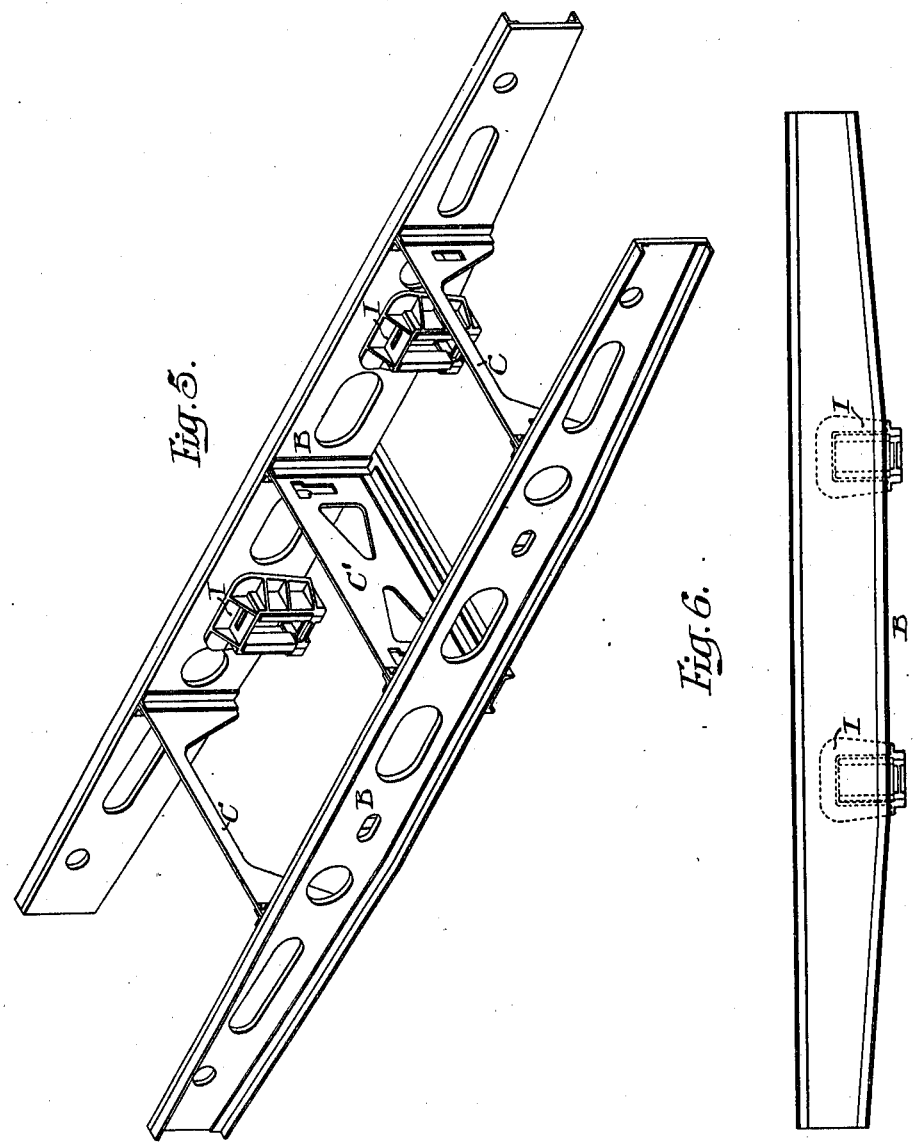

UNITED STATES PATENT OFFICE.

GEORGE C. ABBE, OF LANSDOWNE, PENNSYLVANIA, ASSIGNOR TO BALDWIN LOCOMOTIVE WORKS, OF PHILADELPHIA, PENNSYLVANIA, A CORPORATION OF PENNSYLVANIA.

LOCOMOTIVE-FRAME.

970,287. Specification of Letters Patent. Patented Sept. 13, 1910.

Application filed April 18, 1910. Serial No. 556,060.

*To all whom it may concern:*

Be it known that I, GEORGE C. ABBE, a citizen of the United States, residing in Lansdowne, county of Delaware, State of Pennsylvania, have invented certain Improvements in Locomotive-Frames, of which the following is a specification.

The object of my invention is to construct the frame of a locomotive, especially of the electric type, so that provision will be made for the proper support of the axle boxes without weakening the frame.

In the accompanying drawings:—Figure 1, is a side view of an electric locomotive illustrating my invention; Fig. 2, is a transverse sectional view on the line 2—2, Fig. 1; Fig. 3, is a transverse sectional view on the line 3—3, Fig. 1; Fig. 5, is a sectional plan view on the line 4—4, Fig. 1; Fig. 5, is a detached perspective view of the frame; Fig. 6, is a side view of a solid girder frame; Fig. 7, is a side view of the frame of an electric mine locomotive, illustrating my invention; Fig. 8, is a plan view of a portion of the locomotive illustrated in Fig. 7; Fig. 9, is a sectional view on the line 9—9, Fig. 7; Fig. 10, is a side view of another form of said frame; and Fig. 11, is a sectional view on the line 11—11, Fig. 10.

The frame of an electric locomotive must be made very substantial, as it has to carry considerable weight and oftentimes has to be jacked up at one end so that access may be had to the motors and other mechanism under the locomotive, and in the ordinary type of locomotive it is the usual practice to recess the frame for the reception of the axle boxes and to connect the frame below the boxes, continuing what may be termed the lower chord. This construction is satisfactory so long as the connections below the boxes are in place, or when the stiffness of the locomotive does not have to depend wholly upon the frame, but when a locomotive is jacked up at one end to release an axle the connection has to be removed, thus placing the strain on the weakest part of the frame which in some instances destroys it.

By my invention I make the side members of the frame of a girder construction and I do not recess the girder for the reception of the boxes, but secure the guides for the boxes on the inside of the girder, leaving the upper and lower chords of the girder intact and perfectly rigid.

Referring in the first instance to Figs. 1 to 5, both inclusive, which illustrate an electric locomotive, A is the frame of the locomotive consisting of two plate girders B extending from one end of the locomotive to the other, and these girders are slightly tapered from the center toward each end. The girders are connected together at intervals by cross members C, C′ and mounted above the frame is the platform D supported by transverse girders E and longitudinal beams F. Upon this platform is the cab G of the usual type. In the present instance the girders B have angle irons $b$ secured at the upper and lower edges to stiffen them and thus reinforce the upper and lower chords. The girders E as well as the cross members C, C′ may be made up of plates and angles, as desired, depending upon the size and weight of the locomotive. Secured to the inside of each girder B are pedestal frames I for the reception of the boxes H which may be of any ordinary type, and mounted on these boxes are springs $h$ connected to the equalizing gear of the locomotive. Mounted in the boxes are axles N on which are the wheels $n$, and these axles terminate at the boxes as shown, and do not project through the girders B, B. $h'$, $h'$ are the bars which connect the lower portions of the pedestals below the boxes. When it is wished to remove an axle all that is necessary is to detach the bar $h'$ and either drop the axle with its box while the frame of the locomotive is properly supported, or to jack up one end of the frame. As the frame is made up of solid girders B, B it can be raised and supported at one end without placing undue strain upon any particular part, as the plates of which the girder is composed are of such strength as to properly support the load at any point. As illustrated in Figs. 1 and 5, I preferably perforate the plates of the girders without destroying the upper and lower chords, so that the mechanism back of the girders can be inspected and lubricated.

In Figs. 7, 8 and 9, I have illustrated my invention as applied to a frame of a mine locomotive. In this instance B′ is the girder and I′, I′ are the pedestal frames secured to the inside of the girder B′ adapted to receive the boxes H′ of the axles N′. In this instance an angle bar forms the internal flange running over both pedestal frames, stiffening the girder and forming a bearing for the coiled springs $h^2$.

In Figs. 10 and 11, I have illustrated another modification in which $B^2$ is the girder and $I^2$ is a pedestal frame. In this construction the pedestal frame extends over the box $H^2$ and forms a support for the spring $h^3$.

All the figures in the drawings illustrate my invention as applied to an electric locomotive, but it will be understood that in some instances the invention can be applied to other locomotives where the axles do not extend beyond the side frames, so that the frames can be made in the form of girders which are not recessed for the reception of the boxes; the boxes being mounted on pedestals secured to the inner sides of the girders, as illustrated above.

I claim:—

1. The combination in a locomotive or other vehicle, of a frame consisting of two longitudinal girders, one on each side of the locomotive, with axle box pedestals secured to the inner side of each girder, the lower chord of the girder being intact and extending past the point where the axle box pedestals are secured.

2. The combination in a locomotive, of a frame made of two longitudinal girders, a series of pedestals secured to the inner side of each girder, boxes mounted in the pedestals, and axles mounted in the boxes and terminating inside of the girders.

3. The combination in a frame for locomotives, of two longitudinally arranged girders, a series of cross members extending from one girder to the other, pedestal frames secured to the inner sides of the girders, boxes in the said pedestal frames, and axles mounted in the boxes and terminating inside of the girders.

4. The combination in an electric locomotive, of a frame made of two longitudinally arranged girders, a series of transverse members coupling the girders, a platform mounted on the said frame, a series of pedestal frames secured to the inner side of each longitudinal girder, boxes mounted in the said pedestal frames, and axles in the boxes, said axles terminating inside of the girders, the said girders extending from one end of the locomotive to the other and having their upper and lower chords intact.

5. The combination in a frame of a locomotive, of two longitudinal girders having their upper and lower chords intact, pedestals secured to the inner side of each girder, boxes mounted in the pedestals, axles, and equalizing gears, the plates of said girders being perforated at intervals whereby access may be had to the mechanism back of the girders.

In testimony whereof, I have signed my name to this specification, in the presence of two subscribing witnesses.

GEORGE C. ABBE.

Witnesses:
JOHN J. RICHARDSON,
GRAFTON GREENOUGH.